June 3, 1969  R. D. PALFREYMAN  3,447,766
CONTROL STICK WITH SOLID STATE SENSORS
Filed Feb. 14, 1967
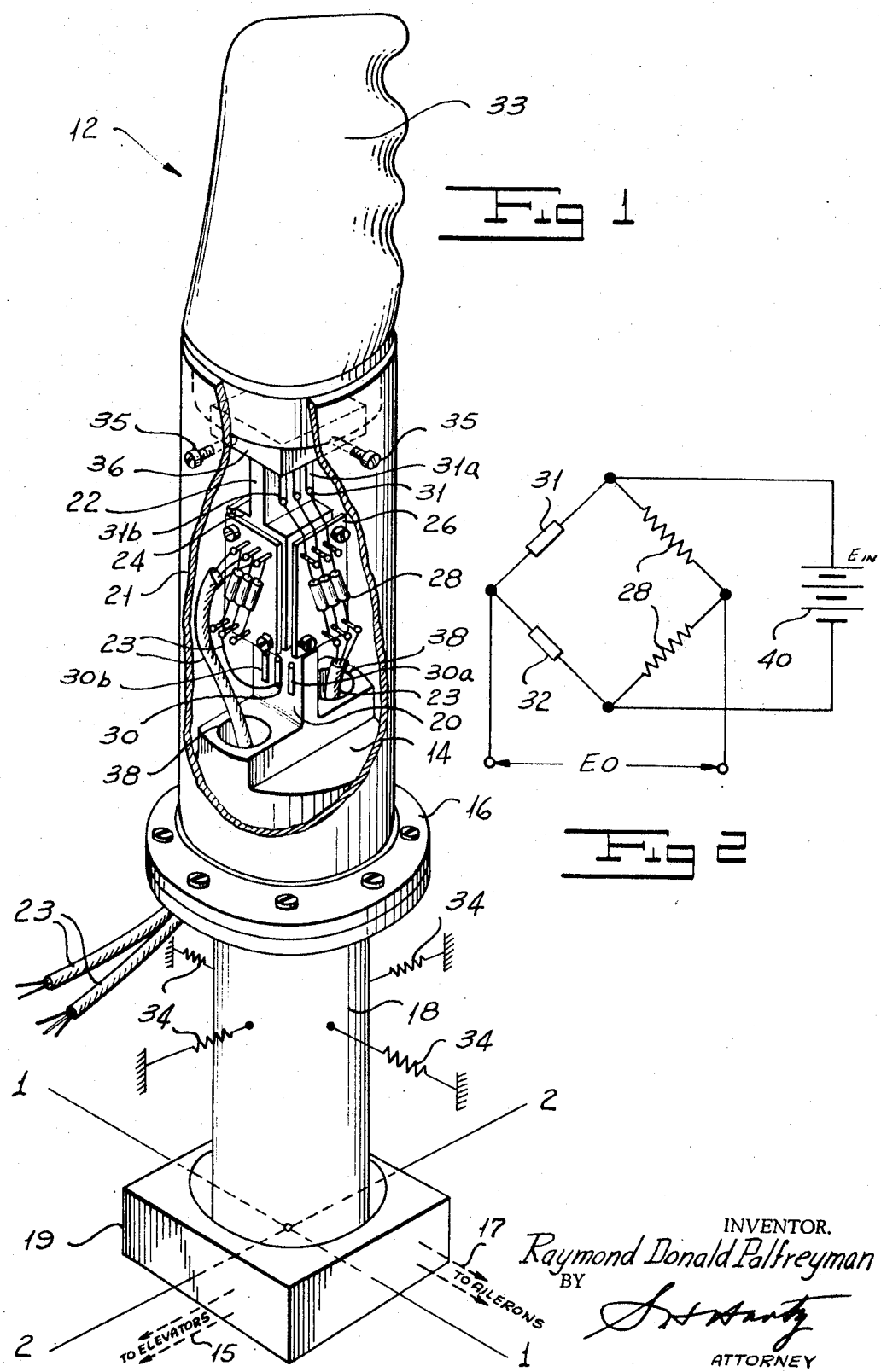
INVENTOR.
Raymond Donald Palfreyman
BY
ATTORNEY

United States Patent Office 3,447,766
Patented June 3, 1969

3,447,766
CONTROL STICK WITH SOLID STATE SENSORS
Raymond D. Palfreyman, Clifton, N.J., assignor to The Bendix Corporation, a corporation of Delaware
Filed Feb. 14, 1967, Ser. No. 616,067
Int. Cl. B64c *13/04*
U.S. Cl. 244—83                          3 Claims

ABSTRACT OF THE DISCLOSURE

A control element having spring members orthogonal to one another and each spring member mounting semiconductor strain gauges to provide signals corresponding to the flexure of the associated spring member. The strain gauges on each spring member may be connected in a bridge circuit to differentially unbalance the bridge and provide an electrical output corresponding to the force applied to the spring member.

BACKGROUND OF THE INVENTION

Field of the invention

This invention relates to the field of measuring and testing and more particularly to means for sensing the flexure of a control element.

Description of the prior art

Heretofore, control sticks for manually controlling aircraft used synchros or movable core transformers for detecting displacement of the control stick. Relative movement of the rotor and stator of the synchro or movement of the core relative to the windings of the transformer was accompanied by internal friction and hysteresis which introduced erroneous measurement. Further, redundance in such systems is not practical if minimum weight and size is desired.

The present invention overcomes the difficulties encountered heretofore by utilizing solid state strain gauges attached to the control element to detect pilot applied forces on the control element about two orthogonal axes. The control element has a pair of spring sections orthogonal to one another to detect forces applied to the control element about two mutually perpendicular axes. At least one strain gauge is preferably mounted on each side of a spring section to simultaneously detect the compression and tension of the spring section. The strain gauges associated with each spring section are connected in a Wheatstone bridge to differentially unbalance the bridge when the spring section flexes and provides an output corresponding to the force applied to the spring section of the control element.

A force applied about one axis flexing one spring section does not cause appreciable flexure of the spring section orthogonal thereto. The strain gauges provide for highly accurate sensing of the force applied to the control element about each axis. Redundancy is easily provided by duplicating the arrangement since the strain gauges are small and of light weight.

SUMMARY

One object of the present invention is to sense force applied to a control element with no moving parts.

A further object of the invention is to sense pilot applied force to the control stick of an aircraft without erroneous measurements caused by hysteresis and internal friction.

Another object is to measure forces applied to a control element about two orthogonal axes.

A further object of the invention is to provide a control element having spring members in orthogonal relationship and strain gauges mounted thereto wherein a force about one axis does not cause an appreciable flexure about an orthogonal axis.

A further object of this invention is to provide redundancy in measuring the force applied to a control element of an aircraft.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

DESCRIPTION OF THE DRAWING

FIGURE 1 is a perspective view of a control stick constructed according to the present invention; and
FIGURE 2 is a circuit diagram for providing electrical signals corresponding to the forces applied to the control stick of FIGURE 1.

Referring to FIGURE 1, the novel control element constructed according to the invention is shown as an aircraft control stick 12 having a base 14 rigidly connected to a control column 18 terminating in conventional linkage or differential gears generally indicated at box 19 which in turn are mechanically connected, as indicated by the arrows 15 and 17, to aircraft surfaces (not shown) such as elevators and ailerons. The gears or linkage 19 are responsive to mechanical movement of the control stick about two mutually perpendicular axes 1—1 and 2—2 as shown. Axis 1—1 may be positioned parallel to the pitch axis and axis 2—2 may be positioned parallel to the roll axis of the craft.

The control stick 12 is mounted within a tubular sleeve 21 having a flange 16 attached to control column 18. The control stick includes a cantilevered spring section 20 flexible about axis 1—1 but rigid about axis 2—2 and a spring section 22 flexible about axis 2—2 but rigid about axis 1—1.

A rigid mounting block 24 intermediate spring sections 20 and 22 mounts terminal boards 26 for mounting electrical circuit elements, such as resistors 28, for the purpose referred to hereinafter.

A suitable hand grip 33 is provided at the end of the stick opposite control column 18 for the convenience of the pilot. Conventional feel springs 34 are attached to control column 18 to provide resistance to pilot applied force on the control stick regardless of the resistance encountered from linkage or differential gears at 19. Adjustable stops 35 are threaded in sleeve 21 adjacent shoulders 36 of the control stick to limit flexure of spring sections 20 and 22. Channels 38 through the base 14 receive electrical conductors 23 from electrical elements, such as resistors 28. The electrical conductors extend out of the base 14 and sleeve 21 to make electrical connections necessary to provide a booster or motor assist means whereby the aircraft surfaces, in addition to being mechanically linked to the control stick, may be driven by a motor responsive to an electrical signal corresponding to force applied to the control stick.

A semiconductor strain gauge 30 is attached to one side and a similar strain gauge (not shown) is attached to the opposite side of spring section 20 and strain gauge 31 is attached to one side and similar a strain gauge 32 is attached to the opposite side of spring section 22 by any suitable bonding means, such as an epoxy adhesive. The strain gauges may be of any suitable semiconductor types such as the piezo-resistive type strain gauges which effect a change of electrical resistance when a tensile or compressive stress is applied thereto. The strain gauge on one side of the spring section is under compression and the train gauge on the opposite side is under tension when the spring section flexes and the change in resistance of the strain gauges is a measure of the flexure of the spring section.

While the embodiment shown and described uses similar strain gauges of either positive or negative gauge factor on opposite sides of a spring section so that one strain gauge is in compression and the other strain gauge is in tension, it should be understood that strain gauges having positive and negative gauge factors may also be used. With this arrangement the positive and negative factor strain gauges will be mounted on the same side of a spring section so that both strain gauges are under tension or compression, depending upon the direction of flex of the spring section. The resistance of one strain gauge will increase and the resistance of the other strain gauge will decrease to provide a differential output from the bridge circuit in which the strain gauges are connected.

Referring to FIGURE 2, a Wheatstone bridge having an input source 40 of direct or alternating voltage is shown wherein piezo-resistive strain gauges 31 and 32 on opposite sides of a single spring section 22 are connected in a balanced configuration with two resistors 28. A similar bridge circuit is provided for strain gauges on spring section 20. In the balanced configuration spring sections 20 and 22 are not flexed and output voltage $E_0$ of FIGURE 2 is zero.

OPERATION

Forces applied by the pilot to hand grip 33 of the control stick produce stress in either or both of spring sections 20 and 22 depending on the direction of the applied force with respect to axes 1—1 and 2—2 corresponding to the pitch and roll axes of the aircraft. A strain gauge 31 on one side of a spring section 22 will, for example, be under tension and strain gauge 32 on the opposite side of spring section 22 will be under compression for a given flex about axis 2—2 to the left and rear as shown in FIGURE 1. The piezo-resitive properties of the strain gauges effect a change in electrical resistivity with the applied stress thereby producing a high proportional signal output.

In particular, a force applied about axis 2—2, for example, flexes spring section 22 and causes the attached strain gauges 31 and 32 to change resistance to differentially unbalance the bridge and provide an output voltage $E_0$ corresponding to the force applied to the control stick about axis 2—2. Similarly, a Wheatstone bridge may be provided to measure flexure of spring section 20 caused by any force component exerted about the axis 1—1.

If redundancy is desired, then a plurality of strain gauges may be mounted on each side of the spring sections 20 and 22 such as shown by the strain gauges 30A and 30B on one side of spring section 20 and strain gauges 31A and 31B on one side of spring section 22 and the strain gauges may be connected in bridge circuits in the manner illustrated above.

The device so designed has negligible hysteresis since there are no moving members except the control element as a whole. The fixed or adjustable stops 35 limit the flexure of the spring sections 20 and 22 with respect to tubular sleeve 21 thus providing protection to the spring sections and strain gauges 30–32 from overload forces.

Although the invention has been described and is embodied in a control stick, it is contemplated that the invention may be embodied also in control wheels and force links employing stressed spring members where the measurement of components of force are required about orthogonal axes.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

I claim:
1. A control stick for controlling a craft comprising:
   a first spring section adapted to flex upon a force being exerted on the control element about a first axis and being rigid about a second axis at right angles to the first axis;
   a second spring section adapted to flex upon a force being exerted on the control element about the second axis and being rigid about the first axis;
   a control column rigidly connected to the spring sections; and
   a solid state stress sensor mounted on each of the spring members and responsive to flexure of the associated spring section and the stress sensors providing signals corresponding to the forces exerted on the control element about the first and second axes.
2. A control element as defined in claim 1 wherein:
   the solid state stress sensors comprise piezo-resistive strain gauges which change electrical resistance when tensile and compressive forces are applied thereto;
   the stress sensors being connected in bridge circuits and being arranged to unbalance the bridge circuits to provide outputs corresponding to the forces exerted on the control element about the first and second axes.
3. A control element as defined in claim 2 in which a pair of solid state stress sensors are mounted on each spring section and are connected in a bridge circuit,
   the stress sensors being arranged so that the resistance of one of the stress sensors increases and the resistance of the other stress sensor decreases when the spring member flexes and the stress sensors being connected in the bridge circuit to unbalance the bridge circuits differentially to provide outputs corresponding to the forces exerted on the control stick about the first and second axes.

References Cited

UNITED STATES PATENTS

| | | | |
|---|---|---|---|
| 2,844,959 | 7/1958 | Grass | 338—5 X |
| 3,261,204 | 7/1966 | Jacobson | 338—5 X |
| 3,315,202 | 4/1967 | Johns et al. | 338—5 X |
| 3,321,964 | 5/1967 | Kolman | 73—141 |
| 3,280,623 | 10/1966 | Saxl. | |

FOREIGN PATENTS 687,823   2/1953   Great Britain.

REUBEN EPSTEIN, *Primary Examiner.*

U.S. Cl. X.R.

73—141; 74—471; 338—5.